(12) United States Patent
Muser

(10) Patent No.: US 7,731,644 B2
(45) Date of Patent: Jun. 8, 2010

(54) DEVICE FOR LOADING AND UNLOADING OF A MACHINE TOOL

(76) Inventor: Miguel Muser, Am Waldrein 42, A-8073 Seiersberg (AT)

( * ) Notice: Subject to any disclaimer, the term of this patent is extended or adjusted under 35 U.S.C. 154(b) by 86 days.

(21) Appl. No.: 11/898,192

(22) Filed: Sep. 10, 2007

(65) Prior Publication Data
US 2008/0070768 A1 Mar. 20, 2008

(30) Foreign Application Priority Data
Sep. 14, 2006 (AT) .............................. A 1532/2006

(51) Int. Cl.
*B23Q 3/157* (2006.01)
(52) U.S. Cl. .............................. 483/61; 483/49; 483/53; 483/902
(58) Field of Classification Search ................. 483/902, 483/901, 44–46, 48–49, 51–53, 60–61; 901/16, 901/19, 31
See application file for complete search history.

(56) References Cited

U.S. PATENT DOCUMENTS

| | | | | |
|---|---|---|---|---|
| 4,587,716 | A | * | 5/1986 | Bytow ......................... 483/14 |
| 5,281,194 | A | * | 1/1994 | Schneider .................... 483/14 |
| 2005/0277529 | A1 | | 12/2005 | Luscher |
| 2007/0184954 | A1 | | 8/2007 | Muser |

FOREIGN PATENT DOCUMENTS

| | | |
|---|---|---|
| AT | 501092 | 6/2006 |
| DE | 4122821 | 1/1993 |
| DE | 19822765 | 12/1999 |
| DE | 102004028151 | 12/2005 |
| DE | 102005017524 | 2/2006 |
| EP | 1074336 A2 * | 2/2001 |
| EP | 1607174 | 12/2005 |

OTHER PUBLICATIONS

Machine Translation of EP-1607174 (EP-1607174 was published Dec. 2005), 5 pages total.*

* cited by examiner

*Primary Examiner*—Erica E Cadugan
(74) *Attorney, Agent, or Firm*—Dykema Gossett PLLC

(57) ABSTRACT

A device for loading and unloading a machine-tool with tools, the tools being mounted in a tool store and being transportable via a manipulation device, which is particularly movable along multiple axes to a transfer position on the machine tool or in the machine tool and, after use in the machine tool, being removable therefrom, and the manipulation device having a gripper device for receiving the tools. To save weight and increase the access speed of the manipulation device, the manipulation device has at least one displacement arm movable in a preferably horizontal first movement direction, which is mounted so it is displaceable on a guide element, and the gripper device is mounted so it is displaceable on the displacement arm in this first movement direction.

18 Claims, 3 Drawing Sheets

DEVICE FOR LOADING AND UNLOADING OF A MACHINE TOOL

BACKGROUND OF THE INVENTION

The present invention relates to a device for loading and unloading a machine tool with tools, the tools being stored in a tool store and being transportable via a manipulation device, which is particularly movable along multiple axes, to a transfer position on the machine tool or in the machine tool and, after use in the machine tool, being removable therefrom, and the manipulation device having a gripper device for receiving the tools.

In connection with loading and unloading, in particular automated loading and unloading of a machine tool, such as a milling machine, receiving a prepared tool by a manipulation device provided with a gripper device with the aid of particularly automated devices which are movable along multiple axes, upon which, after a movement of the manipulation device between a magazine, or store, to a transfer position on or in the machine tool, the supplied tool is deposited or situated in the machine tool and typically installed via a corresponding changing device from the receptacle—or transfer station—in the machine tool. Simultaneously with an accommodation of a new tool by the changing device of the machine tool, a tool used in an immediately preceding work step is deposited on the receptacle or transfer station or position and then received by the manipulation device, which is particularly movable along multiple axes, and in turn returned to a store or magazine. The movement of the gripper device typically occurs via simple linear axes (toothed racks, spindle or belt drives). A manipulation device of this type is known, for example, from AT 501.092 A2.

DESCRIPTION OF PRIOR ART

A storage configuration for processing machines is known from DE 10 2004 028 151 A1, which has at least two storage shelves situated vertically one over another, each having multiple tool or workpiece holders, the tool or workpiece holders being situated on a circle. Tools or tool holders may be received or deposited via a movable gripping arm, which is situated so it is rotatable around an axis through the center point of the circle formed by the storage holders.

EP 1 607 174 A1 discloses a depositing and equipping device for tools having a manipulator for the tools. The manipulator may, using a tool gripper which is translationally movable transversely to a vertical axis and parallel to the vertical axis, transport a tool from the machine tool to a predefined storage place and vice versa, the manipulator being movable in front of and parallel to linear rows.

DE 198 22 765 A1 describes a handling device having a frame, an add-on plate displaceably guided on the frame, a horizontal slide, and a vertical slide. The drives for the add-on plate, the horizontal slide, and the vertical slide are attached to the frame and coupled via force transmission means to the add-on plate, the horizontal slide, and the vertical slide.

DE 10 2005 017 524 A1 discloses a tool changing system for a machine tool, having a tool magazine and a tool gripper, via which a tool to be changed is removable from a spindle-side tool receptacle using a transfer unit driven by a single drive for removing and transferring a tool between tool magazine and tool gripper. The tool holder is movable between the tool magazine and the tool gripper along a movement path and is movable along a transfer path aligned with the movement path to remove or transfer the tool from or to the tool magazine.

Furthermore, a tool magazine having assigned tool changing unit is also known from DE 41 22 821 A1, the magazine, which is implemented as a vertical shelf, having a raster rear wall, which may be equipped with multiple individual carrier units in a formfitting and frictionally locked way, so that tools received in the carrier units are oriented both horizontally and also vertically and may particularly be stored in the magazine interleaved with one another.

It is a disadvantage that known drives are relatively slow and have comparatively large masses to be moved.

SUMMARY OF THE INVENTION

The object of the present invention is to avoid these disadvantages and increase the travel velocity of the manipulation device.

This is achieved according to the present invention in that the manipulation device has at least one displacement arm movable in a preferably horizontal first movement direction, which is mounted so it is displaceable on a guide element, and the gripper device is mounted so it is displaceable on the displacement arm in this first movement direction, to perform the displacement movement, the gripper device of the displacement arm displaceable by drive means preferably having at least one first traction medium guided over multiple deflection rolls. The first traction medium is permanently connected to the guide element and to the gripper device.

In this way, during a displacement movement of the displacement arm, the gripper device is moved at twice the velocity of the displacement arm in the first movement direction. The movement of the gripper device in the first movement direction thus essentially occurs telescopically.

The displacement arm may have a toothed rack, which engages by meshing with a driven gearwheel mounted on the guide element, as drive means. The gearwheel may be driven via a torque shaft via the columns.

In an especially preferred embodiment variant of the present invention, the displacement arm has at least one second traction medium drivable via a drive device and guided over multiple deflection rolls. This second traction medium transmits a rotational and linear movement via deflection rolls to the gripper device. This rotational and linear movement may be used there for driving in a third movement direction, for example.

At least one of the deflection rolls, preferably a deflection roll situated in the guide element, is used for driving the second traction medium. This deflection roll is driven via at least one torque shaft, the drive device for the torque shaft being able to be situated in or on the columns.

In the scope of the present invention, the guide element may be displaceable in a preferably vertical second movement direction implemented essentially perpendicularly to the first movement direction, the guide element preferably being mounted so it is displaceable in guides of a fixed column in the vertical direction.

BRIEF DESCRIPTION OF THE PREFERRED EMBODIMENTS

The present invention is explained in greater detail in the following by the figures.

DETAILED DESCRIPTION OF THE PREFERRED EMBODIMENT

Figure 1:
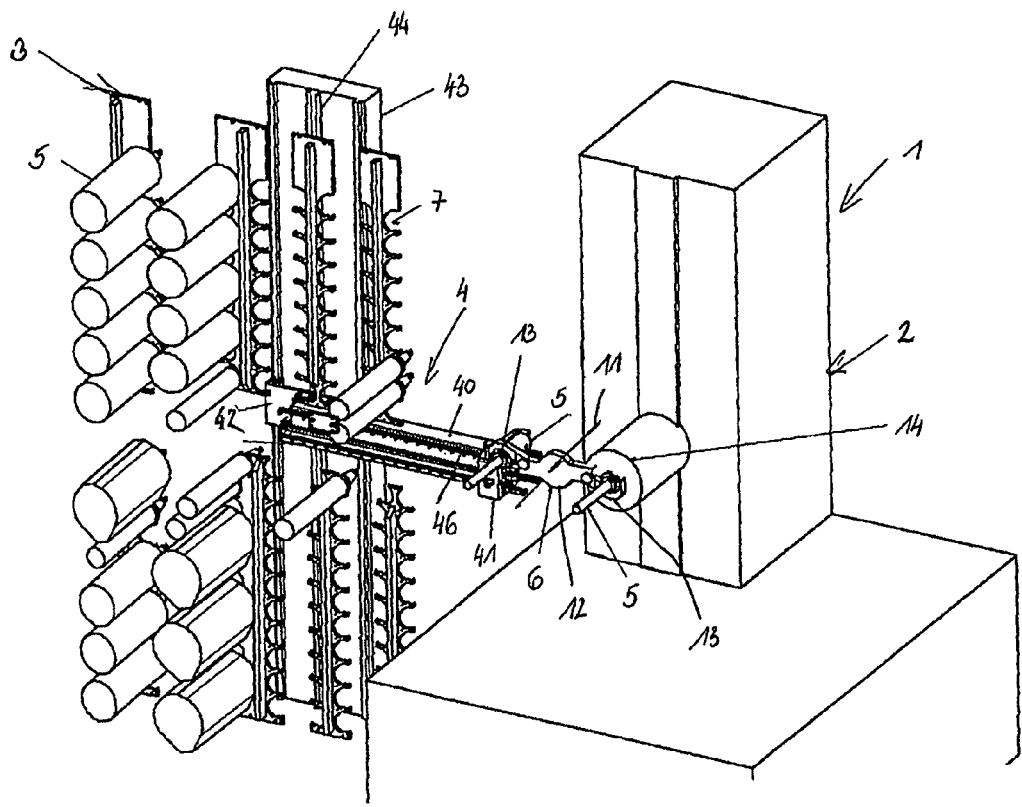
FIG. 1 shows a processing center having a system according to the present invention for loading and unloading a machine tool in a diagonal view.
Figure 2:
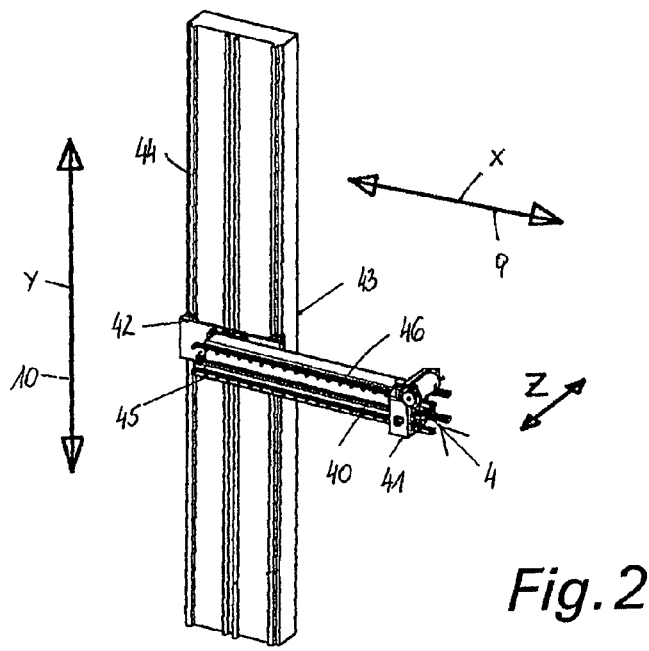
FIG. 2 shows the system according to the present invention in a diagonal view.
Figure 3:
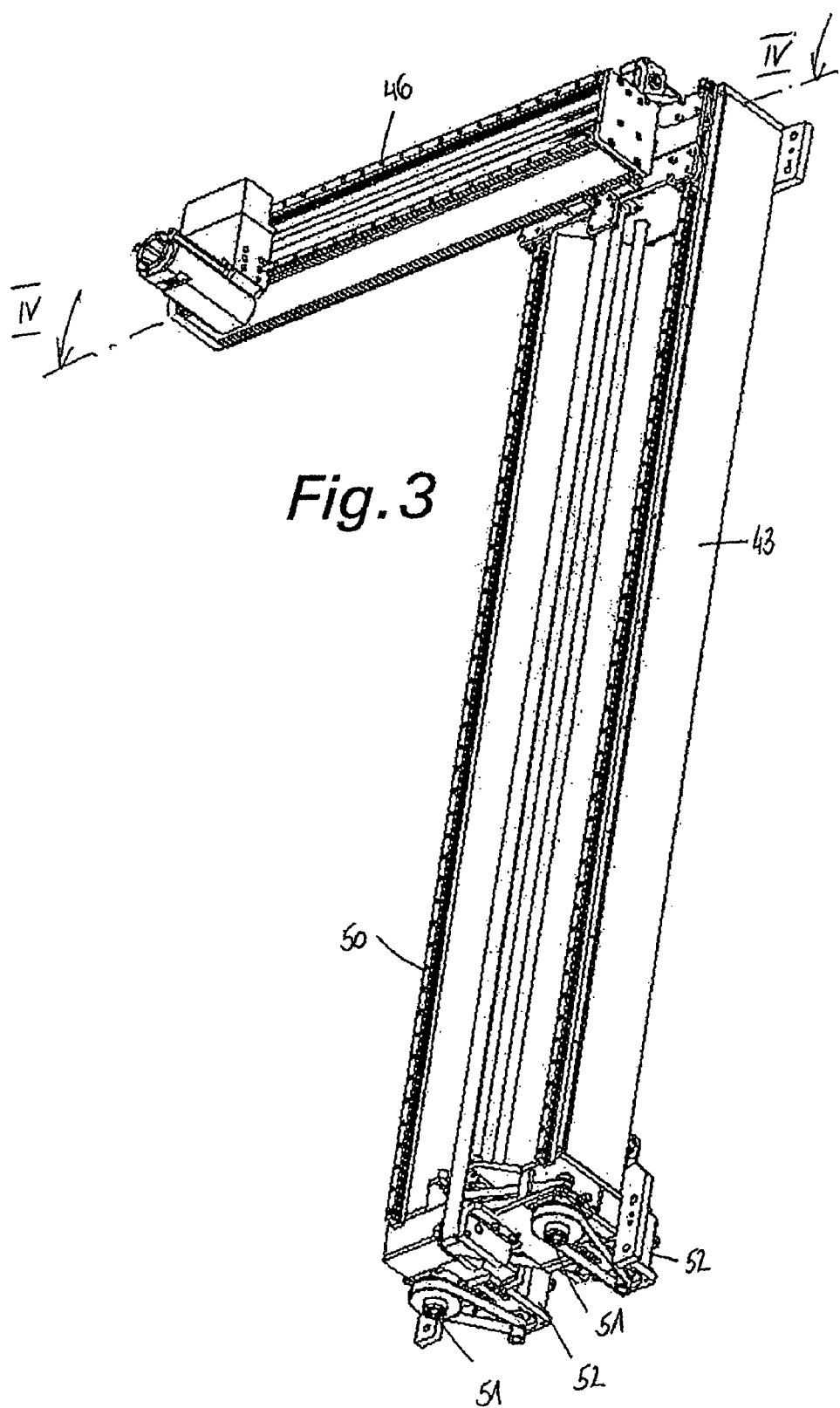
FIG. 3 shows the system in a further diagonal view.

The processing center 1 comprises a machine tool 2, a tool store 3, which is formed in the exemplary embodiment by a matrix magazine, a manipulation device 4 for tools 5, and a tool changer 6. The tool store 3 has a number of openings 7 in corresponding storage elements for receiving tools 5. Multiple tools 5 are stored in an x-y coordinate system in the tool store 3.

The manipulation device 4, which is movable or pivotable along multiple axes x, y, z or directions, is used for removing the tools 5 from the tool store 3 and for transferring them to the tool changer 6, a movement in the horizontal direction being indicated by the double arrow 9 and a movement in the vertical direction by the double arrow 10. The manipulation device 4 transfers or receives tool 5 to or from tool changer 6, which has a changer circular head 12, pivotable around an axis 11, having two opposing grippers 13. The tool changer 6 places the tool 5 on the spindle 14 of the machine tool 2 or removes the tool 5 therefrom. To allow this, the changer circular head 12 of the tool changer 6 may perform thrust movements in the z direction.

The manipulation device 4 has a displacement arm 40 movable in the direction of the x axis. A gripper device 41 is mounted so it is displaceable in the direction of the x axis on the displacement arm 40. The displacement arm 40 is itself situated so it is displaceable on a guide element 42. The guide element 42 is in turn implemented as movable along a vertical column 43 in the direction of the second movement direction y, guides 42a of the guide element 42 being guided in rails 44 of the column 43.

The guide element 42 has a base plate 42b, which is permanently connected to the guides 42a. The base plate 42b of the guide element 42 is connected fixed to a first traction medium 46, which is situated in the displacement arm 40 and is guided over multiple deflection rolls 47. At least two of these deflection rolls 47 are situated on opposite ends of the displacement arm 40.

Figure 4:
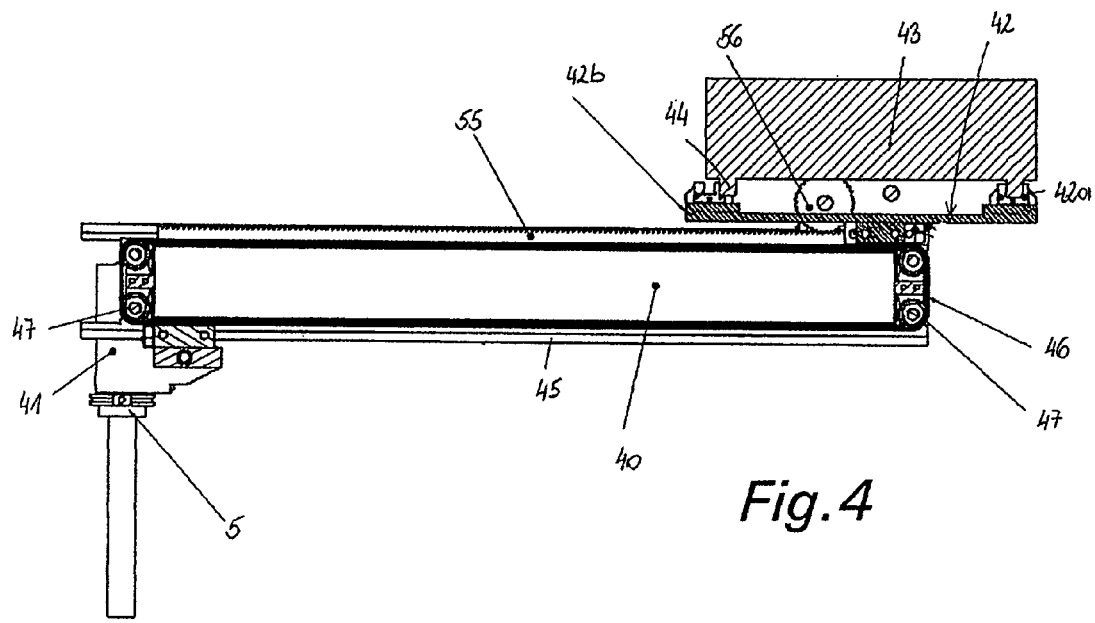
FIG. 4 shows the system in a section along line IV-IV in FIG. 3.
Figure 5:
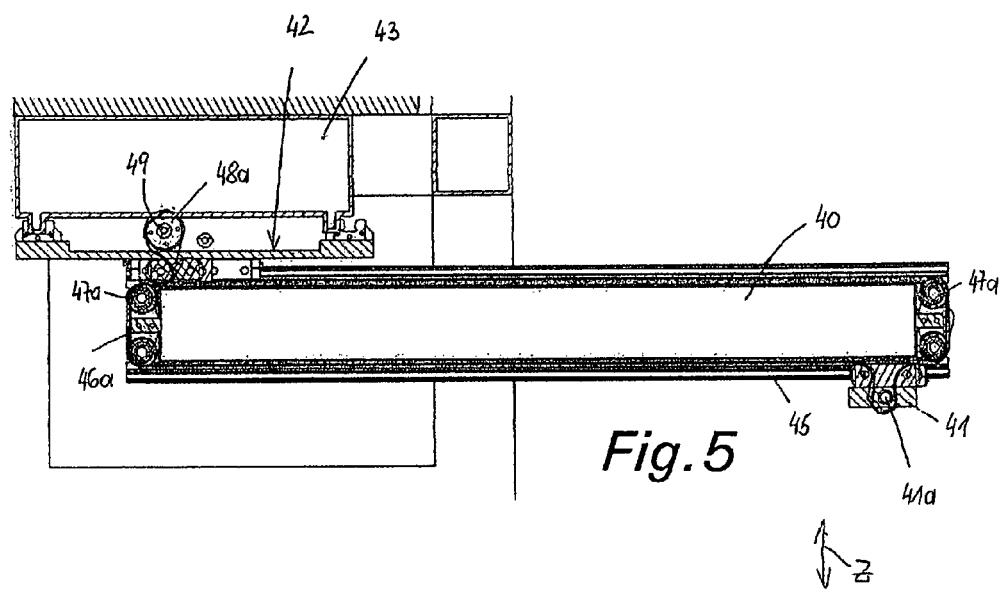
FIG. 5 shows the system in a further section.

The displacement arm 40 has a toothed rack 55, which engages by meshing in a driven gearwheel 56 mounted on the guide element 42. The displacement arm 40 is displaced in the direction of the first movement direction x by pivoting the gearwheel 56. Because the base plate 42b is connected fixed to the first traction medium 46, the first traction medium 46 is driven by the displacement movement of the displacement arm 40 and thus the gripper device 41 is moved in the same way as the displacement arm 40, but with twice the velocity in the first movement direction x. FIG. 4 and FIG. 5 show the displacement arm 40 and the gripper device 41 in two different final positions.

The reference numeral 45 refers to the guide of the gripper device 41 on the displacement arm 40.

To remove and deposit the tool 5, it is advantageous if the gripper device 41 may displace the tool 5 in the third movement direction z, which is perpendicular to the first movement direction x. To allow this, the displacement arm 40 has a second traction medium 46a, which is guided around deflection rolls 47a. Furthermore, the second traction medium 46a is guided around a deflection roll 48a in the guide body 42. This deflection roll 48a is used as a drive for the second traction medium 46a, the deflection roll 48a itself being driven via a torque shaft 49. An output shaft 41a of the gripper device 41 is driven by the second traction medium 46a and is used for actuating a displacement device (not shown in greater detail) for the third movement direction z, for example, using a screw or bevel gear.

The first and/or second traction medium 46, 46a may be implemented as a belt, a chain, a cable, or the like.

The guide body 42 may also be driven in the direction of the y axis via a traction medium 50.

All drive motors 52 are situated so they do not also travel, the force transmission of the y axis and z axis occurs via torque shafts 51. The rotational movement is relayed to the drive wheel 48a via these shafts. The drive in the z direction also occurs via a torque shaft 51.

This design has the advantage that weight may be saved for the moving parts and data and power lines for the displaceable elements of the manipulation device 4 may be dispensed with.

I claim:

1. A device positioned for loading and unloading a machine tool with tools, the tools being stored in a tool store, the device comprising:
    a manipulation device having portions that are movable along multiple axes for transporting the tools to a transfer position on the machine tool or in the machine tool, and, after use in the machine tool, for removing the tools from the machine tool, the manipulation device including a gripper device for receiving the tools, a guide element, and a displacement arm which is mounted on the guide element and movable relative thereto in a first movement direction, the gripper device being mounted on and displaceable along the displacement arm in said first movement direction, and wherein the displacement arm is displaceable by a drive medium and comprises a first traction medium guided over a first set of deflection rolls, and a toothed rack which engages by meshing with a driven gearwheel mounted on the guide element.

2. The device according to claim 1, wherein the displacement arm includes a second traction medium which is drivable via a drive device and guided over a second set of deflection rolls.

3. The device according to claim 2, wherein at least one of the deflection rolls is situated in the guide element.

4. The device according to claim 2, wherein at, least one deflection roll of the second set of deflection rolls is driven.

5. The device according to claim 4, wherein the driven deflection roll is driven via a torque shaft.

6. The device according to claim 2, wherein the second traction medium is situated parallel to and neighboring the first traction medium.

7. The device according to claim 6, wherein at least two deflection rolls of the first set of deflection rolls and the second set of deflection rolls have identical axes.

8. The device according to claim 1, wherein the gripper device is permanently connected to the first traction medium.

9. The device according to claim 1, wherein the guide element is fixedly connected to the first traction medium.

10. The device according to claim 1, wherein the guide element is displaceable in a second movement direction, which is essentially perpendicular to the first movement direction.

11. The device according to claim 10, wherein a second traction medium displaces the gripper device in a third movement direction, which is perpendicular to the first movement direction.

12. The device according to claim 10, wherein the second movement direction is vertical.

13. The device according to claim 1, wherein the first movement direction is horizontal.

14. A device positioned for loading and unloading a machine tool with tools, the tools being stored in a tool store, the device comprising:

a manipulation device having portions that are movable along multiple axes for transporting the tools to a transfer position on the machine tool or in the machine tool, and, after use in the machine tool, for removing the tools from the machine tool, the manipulation device including a gripper device for receiving the tools, a guide element, and a displacement arm which is mounted on the guide element and movable relative thereto in a first movement direction, the gripper device being mounted on and displaceable along the displacement arm in said first movement direction, and wherein the displacement arm includes a first traction medium and a second traction medium which is drivable by a drive device and guided over multiple deflection rolls, the second traction medium being parallel to and neighboring the first traction medium.

15. The device according to claim 14, wherein the first traction medium is guided over multiple deflection rolls, and wherein at least two of the deflection rolls for the first traction medium and the second traction medium have identical axes.

16. A device positioned for loading and unloading a machine tool with tools, the tools being stored in a tool store, the device comprising:

a manipulation device having portions that are movable along multiple axes for transporting the tools to a transfer position on the machine tool or in the machine tool, and, after use in the machine tool, for removing the tools from the machine tool, the manipulation device including a gripper device for receiving the tools, a guide element, and a displacement arm which is mounted on the guide element and movable relative thereto in a first movement direction, the gripper device being mounted on and displaceable along the displacement arm in said first movement direction, and wherein the displacement arm has a traction medium which is drivable via a drive device and guided over multiple deflection rolls, wherein at least one of the deflection rolls for the traction medium is driven, wherein the at least one driven deflection roll is driven via at least one torque shaft and a drive motor for driving the at least one torque shaft is situated on a fixed column.

17. A device positioned for loading and unloading a machine tool with tools, the tools being stored in a tool store, the device comprising:

a manipulation device having portions that are movable along multiple axes for transporting the tools to a transfer position on the machine tool or in the machine tool, and, after use in the machine tool, for removing the tools from the machine tool, the manipulation device including a gripper device for receiving the tools, a guide element, and a displacement arm which is mounted on the guide element and movable relative thereto in a first movement direction, the gripper device being mounted on and displaceable along the displacement arm in said first movement direction, and wherein the gripper device is mounted to be displaceable on the displacement arm relative to the displacement arm in this first movement direction, and wherein at least two deflection rolls for a traction medium are situated on different ends of the displacement arm.

18. A device positioned for loading and unloading a machine tool with tools, the tools being stored in a tool store, the device comprising:

a manipulation device having portions that are movable along multiple axes for transporting the tools to a transfer position on the machine tool or in the machine tool, and, after use in the machine tool, for removing the tools from the machine tool, the manipulation device including a gripper device for receiving the tools, a guide element, and a displacement arm which is mounted on the guide element and movable relative thereto in a first movement direction, the gripper device being mounted on and displaceable along the displacement arm in said first movement direction, and wherein the guide element is displaceable in a second movement direction which is essentially perpendicular to the first movement direction, and wherein the guide element is mounted to be displaceable in the second movement direction, which is a vertical direction, via guides in rails of a fixed column.

* * * * *